10. Builders' Hardware.
[24] Handles.
CLASSIFICATION
84 90 7
DIVISION
11-8-1834
Carton Stell Door Handles
Patented 8th Nov 1834
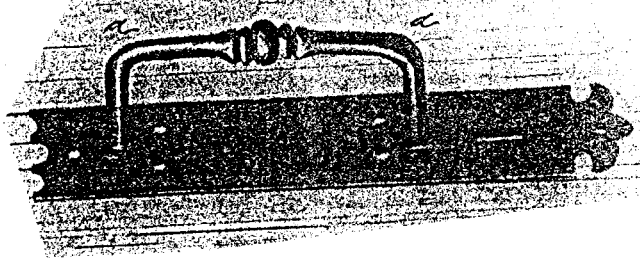

11/8/1834 8490 X

Nov. 8. 1834 463

Harlow Isbell. Meriden. Connecticut.

Letters Patent.

The Schedule referred to in these Letters Patent and making part of the same, containing a description in the words of the said Harlow Isbell himself, of his improve=ment in Door handles, usually called Norfolk=latches.

To all to whom these presents shall come.

Know ye that I, Harlow Isbell, of Meriden, in the County of New Haven, State of Connecticut, a native citizen of the United States, have invented a new and useful improvement in the Door handles usually called Norfolk Latches, which improvement I do specify and describe as follows.

The figure in the annexed plate exhibits an improved door handle, without the thumb-piece, consisting of a plate a.a. and a handle b. In the door handles in common use, the handle b. is made in one piece and fastened to the plate a. by screws or otherwise. In my improved instrument the handle b. is formed by the combination of three pieces of metal, two of which c.c. are made of wrought iron and third is of cast iron. The cast iron is united with the wrought iron at e.e. by casting the metal at the ends d.d around the ends of the wrought iron pieces c.c. or it may be done by screwing or riveting the points together at the same points. A combined or compound door-handle is thus formed, which can then be fastened to the plate, by riveting, or in any other suitable way. The pieces c.c. may be called braces, and the third piece a handle. The mode of uniting them by casting ing

[illegible]

8490X may require some explanation. In order to obtain strength at the angle, and solidity in the cast iron at the place of Junction, a shoulder may be formed at one end of each brace, and one or more notches made in the smaller part next the shoulder and then the metal shoulder be made to extend down about one eighth to one quarter of an inch beyond the shoulder, & and entirely surround and cover the end of each brace. If sand is used to cast the iron on to the ends of the braces so prepared, care must be taken to prevent them from gathering dampness from the mould by keeping them therein, as little time as practicable.

By attending to these directions with other proper and usual precautions, the requisite strength and solidity will be obtained. The braces and the handle may be of any convenient length, shape and size, and either plane or ornamented.

The instrument thus formed, combines & strength, lightness, cheapness and beauty, as its principal advantages.

I claim the exclusive right to make and sell door handles in which that part more particularly called the handle is formed by the combination of wrought iron with cast iron, so that the smaller parts which are Joined to the plate shall be of wrought iron, and the larger part which is usually handled, is made of cast iron, and thus united, form a combined and compound handle.

And I claim merely, and only, the combination and composition of the parts thus adapted to each other, to form the entire compound handle whether united by casting, screwing, or riveting.

Hence I do not claim, that simply to unite wrought

8490X

465 wrought and cast iron in either of the ways mentioned, is any part of my invention, and I have described the process of casting the parts together. merely to enable the publick to make the combination in the best mode with which I am acquainted.

In Testimony that the above is a true specifica of my said improvement I have hereunto set my hand at Meriden this eleventh day of September, in the year of our Lord, one thousand eight hundred and thirty four.

Witnesses
Lyman Collins
Benajah Andrews

Harlow Isbell.

Ex'd. Ch[illegible]

720 [illegible]

Patented November 8. 1834

Drawing